Jan. 8, 1952 — B. AMES — 2,581,343
ELECTRICAL COOKING APPARATUS
Filed July 13, 1948 — 2 SHEETS—SHEET 1
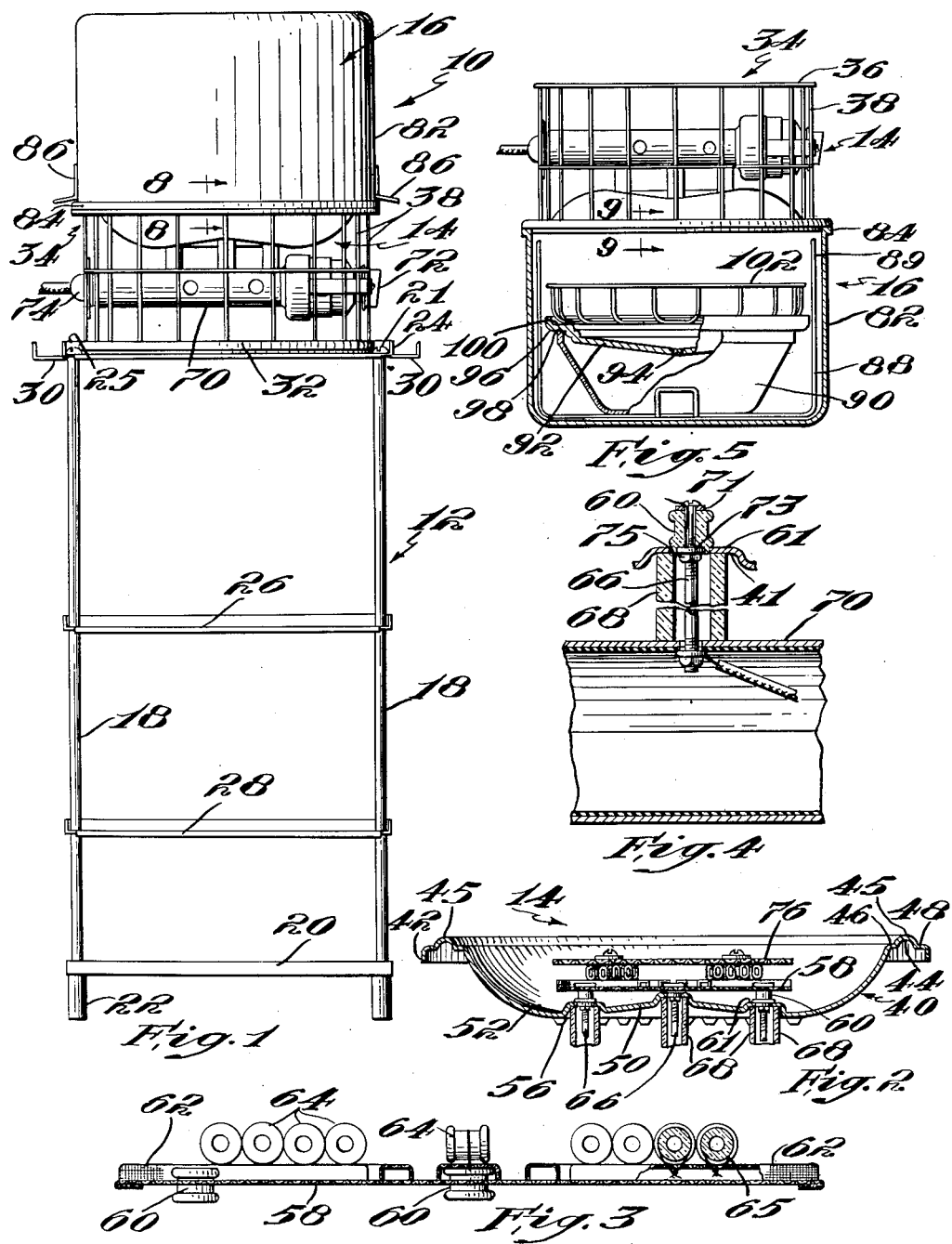
Inventor
Butler Ames
by Roberts, Cushman & Grover
Att'ys.

Inventor
Butler Ames
by Roberts, Cushman & Groves
Att'ys.

Patented Jan. 8, 1952

2,581,343

UNITED STATES PATENT OFFICE 2,581,343

ELECTRICAL COOKING APPARATUS

Butler Ames, Boston, Mass.

Application July 13, 1948, Serial No. 38,399

3 Claims. (Cl. 219—37)

This invention pertains to heating apparatus in which an electrically energized heating unit generates glowing radiant energy. While of broader utility as hereinafter suggested, it is particularly useful when embodied in a cooker for use in preparing food. By this invention, as embodied in a very simple and inexpensive type of apparatus, all sorts of cooking may be carried out most expeditiously, economically and with most satisfactory results from the gastronomical standpoint. One object of the invention is to provide a cooker of very simple, inexpensive type which is readily portable and which is energized by current from the usual lighting circuit. A further object is to provide a simple, inexpensive cooker so designed as substantially to avoid or at least to minimize the delivery of steam or fumes, such as customarily result from the exposure of food, especially greasy food, to baking or broiling temperatures. A further object is to provide a cooker comprising inexpensive parts and wherein the oven or cooking space may be defined, at least as to its top and sides, by a conventional cooking utensil, for example a standard form of cooking pot or kettle. A further object is to provide a cooker which may be used in one position for baking, broiling, etc., and which may be inverted for use in carrying out such operations as boiling, steaming and the like. A further object is to provide a heating apparatus primarily designed for the cooking of food but which is readily adapted to form an efficient means for heating a room. Other and further objects and advantages of the invention will be pointed out in the following more detailed description and by reference to the accompanying drawings wherein:

Fig. 1 is a vertical elevation of the combined heating and cooking apparatus which forms the subject matter of the present invention;

Fig. 2 is a vertical section of the heat generating unit;

Fig. 3 is an elevation partly in section of the combined reflector and support for the heating elements of the heat generating unit;

Fig. 4 is a vertical section showing details of the lead connecting the heating coils to the three-way switch;

Fig. 5 shows an elevation of the cooking device partly in section shown when used in an inverted position;

Figure 6:
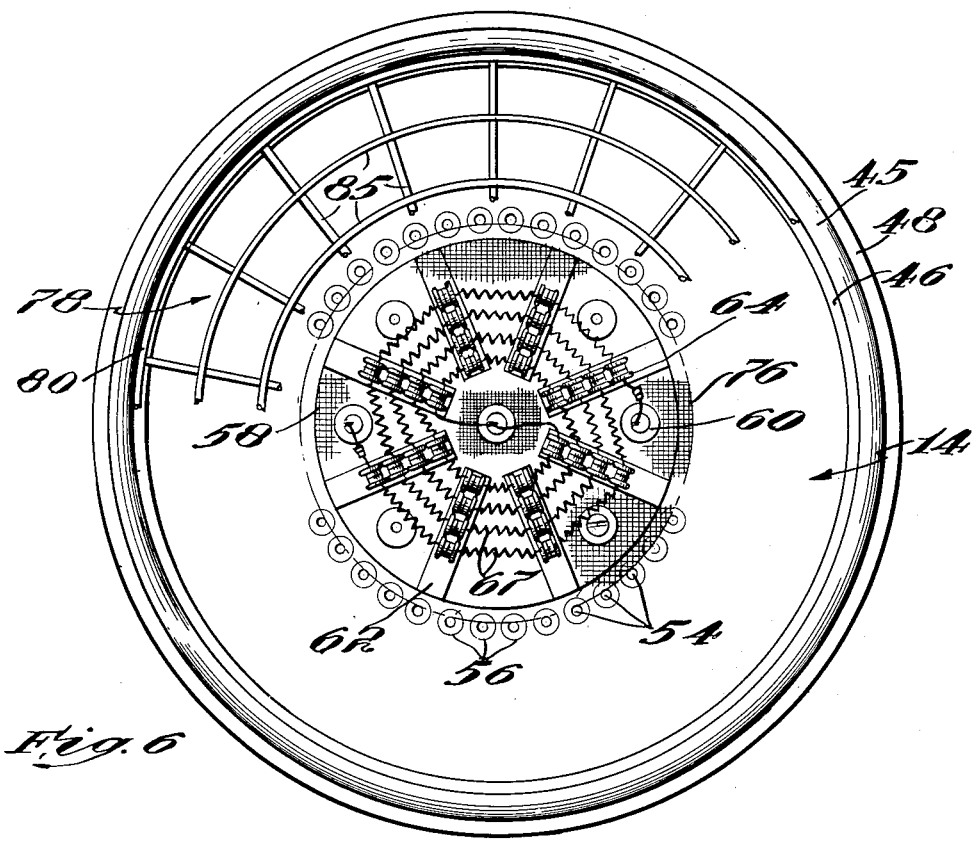
Fig. 6 is a plan view of the heat generating unit.

Referring to the drawings there is illustrated a cooking apparatus which provides for simplicity in the cooking of meats, fish, bread, pastry, etc., with an excellence so far beyond existing practice as to be almost unbelievable, which preserves in the cooked food a specially fine color, appearance, fragrance and texture, which affords superior taste and permits quick and clean cooking without accompanying odors and/or smoke. In fact for cooking steaks and chops, its radiant cooking affords finer flavors and taste even than when such viands are cooked over a bed of red hot charcoal.

The combined heating and cooking device 10 (Fig. 1) is shown as comprised essentially of a supporting frame 12, a heat generating unit 14 and a housing 16 for receiving and retaining viands to be cooked.

The supporting frame 12 may be of conventional table height so that the device may be employed conveniently without setting it on a table or counter and is comprised of four metal rod-like uprights 18 fastened at their lower ends to the four corners of a substantially rectangular base plate 20, the latter being supported from the floor upon four short legs 22 preferably made of some heat insulating material such as glass or plastic. A convenient and desirable way to assemble the rods 18, base 20 and legs 22 together is to cut threads on the lower ends of the rods 18, pass them through apertures in the corners of the base plate and screw them into threaded apertures formed in the upper ends of the legs. The upper ends of the uprights 18 are fastened to the under side of a substantially rectangular top shelf 24 at its four corners by screws 21 passing through the shelf into the top ends of the legs. Preferably the shelf is perforated and has around at least three sides thereof a low rail 25, the fourth side being left open. Between the top shelf and the base plate 20 there are situated one or more spaced substantially horizontal shelves 26 and 28, these shelves in turn being perforated and having rails along their side corresponding to those of the top shelf. The intermediate shelves tend to stiffen the support as a whole. The top shelf is adapted to receive and support the heat generating unit 14, as will appear hereinafter, while the lower or intermediate shelves are adapted to receive and support for storage various cooking receptacles, utensils and other implements used in cooking processes as well as condiments and other ingredients which would be useful. One or more hooks 30 may be fastened to the under side of the top shelf so as to project horizontally outwardly therefrom upon which spoons, ladles, cooking utensils and the like may be hung or suspended against the side of the frame.

A shallow pan 32 is placed upon the top shelf 24 and in this pan there is seated a circular cage 34 consisting of upper and lower wire rings 36 held in vertically spaced relation by a plurality of vertical rods 38 spaced circumferentially of the rings and rigidly joined thereto, for example, by spot welding. The cage 34 in turn forms a support for the heating unit 14 which is independent of the supporting frame 12 and hence, if desired, may be lifted from the pan 32 resting on the top shelf of the frame and placed on a table or counter. It is to be observed that the open structure of the cage 34 permits a free circulation of air in and about the under side of the heating unit so that most of the heat which penetrates through the metal is carried away and hence the device is cool enough so that if placed on a table top or counter as suggested above it will not damage the finished top and may be handled without danger of burning one's self. As shown in Fig. 2, the heating unit 14 comprises a shallow circular bowl 40 which is substantially parabolic in shape. At the rim of the bowl there is an outwardly projecting substantially horizontal flange 42 which has pressed upwardly into its under side a groove 44 for engagement with the top ring 36 (Fig. 8) of the cage. The aforesaid groove forms on the top side of the flange a bead 45, at opposite sides of which are flat substantially horizontal shoulders 46 and 48 the purpose of which will appear hereinafter. The bottom of the bowl 40 is pressed upwardly to provide centrally thereof an island 50 surrounded by an annular trough 52, and in this trough there are formed a continuous series of closely spaced apertures 54 each of which is bordered by a downwardly projecting nipple 56 through which juices and fats exuded from the cooking viands may drain from the vicinity of the heating elements into the shallow pan 32. The bottom is pressed upwardly in such a manner that its sloping surface will reflect the greater part of the radiant heat rays that may impinge upon it in directions to concentrate the heat upon the viands to the best advantage and hence to make the most efficient use of the heat. The bowl preferably is comprised of a light-weight metal, so that its over-all weight is not more than approximately 3½ pounds as compared to the entire weight of the device which is in the neighborhood of 6½ pounds. The inner surface of the bowl is smooth and polished so as to be highly reflective and hence to radiate the greater part of the heat rays striking its surface in directions to impinge upon the viands being cooked. A metal whose surface may be polished to afford substantially total reflection is preferred since under such conditions there will be a minimum heat loss. Moreover, it is also desirable that the metal selected be highly conductive so that any heat which is not reflected by the polished surface thereof will rapidly be conducted to the other parts of the apparatus and hence dissipated. By combining high reflectivity with high conductivity, the apparatus employs the heat to the best advantage, with the greatest efficiency for the power input and at the same time affords a cooking apparatus which does not become hot to the touch and hence may be placed on tables and/or counters without injuring their surfaces.

Figure 10:
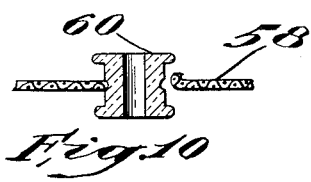
Fig. 10 shows the manner of fixing a spool or grommet in the reflector or protective screen.

A flat substantially circular reflector plate or disk 58 (Figs. 2 and 3) made of a relatively fine mesh wire screen is mounted in the bowl just above the raised island 50 so as to support the heating elements substantially at the focal point of the bowl and to shield the apertures in the bottom of the bowl from the direct rays of the radiant heat. The disk is supported by a plurality of spaced refractory insulating spools 60, one of which is situated centrally of the bowl and the others surrounding the central spool at a distance which is somewhat less than the radius of the disk. As illustrated in Fig. 10, the screen 58 is perforated at suitable points, the wire around the perforations is bent back to make room for insertion of the spools, a spool is inserted in each perforation and then the wire is turned back into engagement with the spool. Preferably each spool has an annular groove in its surface into which the wire may be pushed as it is bent back to lock the spool in the screen. The fine wire mesh of the screen preferably is made of stainless steel or other material that will withstand a heat in the neighborhood of 1800° F. and is sprayed with Alundum, or some other highly refractory cement, which is baked on the wires at approximately 1800° F. The wire must have a low coefficient of expansion which approximates the coefficient of expansion of the Alundum coating so that the latter will not crack and spall during heating and cooling. The lower end of each spool 60 rests on and is fastened to a flat boss 61 (Figs. 2 and 4) pressed upwardly into the island. One of the spools is situated in the center of the island and the others are spaced uniformly about the center spool. The reflector plate 58 (Fig. 3) has pressed upwardly from its surface a plurality of radially directed channels which form on the upper surface radial flat-top ribs 62 to which are fastened a plurality of insulating spools 64. The spools 64 rest on their sides and are placed in succession one against another radially outward along the flat-top ribs each spool being secured by a loop of wire 65 encompassing the body of the spool between its flanges, passing downwardly through the screen and then twisted on itself. Thus there are provided a plurality of concentric circularly arranged spaced apertures through which, as shown in Fig. 6, there are threaded two resistance coils 67, one being nested within the other in conventional fashion, which constitute the heating element. The aforesaid ribs 62 stiffen the disk and support the resistance coils high enough above the disk so as to take advantage of the comparatively large reflective surfaces between them. The coils 67 are connected to a source of power by means of several leads 66 which pass downwardly therefrom through the insulating spools 60. As illustrated, the inner end of each coil extends inwardly to the center spool where the two ends are connected to a common lead which passes downwardly through the center spool and through a vertically arranged Alundum coated insulator tube 68 which extends from the under side of the bowl downwardly and to the wall of a substantially horizontal tube 70 (Fig. 4) which may be made of a refractory material such as porcelain or of a metal coated with Alundum (Fig. 4) the latter being supported at its ends by the wire cage 34. The outer ends of each coil are separately attached to leads which extend down in a similar manner through outer spools and insulator tubes 68 arranged below them to the horizontal tube 70. The leads 66 are there connected to wiring within the tube 70 which is supplied with current by way of the female element of a conventional two-prong coupling 74 fixed in one end of the tube and controlled by a three-position switch 72, to give low, intermediate and high heats, fixed in the other end of the tube. The wiring is designed in a conventional manner to be used with alternating or direct current and for use with a 110 or 220 volt source. The tubes 68 are held in place partly by engagement of their upper ends within the recesses 41 made when the bosses are pushed upwardly into the bottom of the bowl and their lower ends with the upper wall of the tube 70 and partly by the leads 66 which constitute headed screws passing downwardly through the spools 60, situated directly above their upper ends, through the tubes and into the tube 70 where washers placed on the bolts and brought up against the inside of the tube 70 by nuts threaded on the bolts fix them in place.

The connection of the ends of the resistance wires 67 of the heating coils to the leads 66 which in turn are connected to the switch wiring requires a new method due to the fact that the intense heat developed tends to burn off brazing and/or welding connections between these wires and the leads. As illustrated herein, the leads are constituted by headed screws which pass downwardly from the tops of the respective spools 60 through the tubes 68 and into the tube 70. The difficulty is overcome herein (Fig. 4) by slotting the heads of each of these screws for about ½ inch along one side, interpositioning a washer 71 between the head of the same and the top of the spool 60, disposing the wire in the slot within the washer so that it passes downwardly along the shank of the screw and then wrapping it around the shank of the screw. A second washer 73 is then placed on the shank of the screw at the lower end of the spool and a nut 75 is threaded thereon to bind the wire against the top and bottom flanges of the spool.

To protect the incandescent wire coils from fluids which may drop onto them during the cooking process, a flat circular disk 76 (Figs. 2 and 7) of comparatively fine metal wire mesh similar to the disk 58 is mounted above the heating elements in spaced relation thereto by refractory grommets 77. These grommets, like the spools 60, are set into apertures in the mesh of the disk and lock therein by turning the wire surrounding them into annular grooves in their peripheral surfaces. The grommets are fixed to the disk 58 by screws 81 which pass through them and are threaded into refractory inserts 79 fixed in apertures in the metal disk 58. The grommets and inserts serve to insulate the screws from the disks.

Above the heating elements 67 there is supported by the horizontal shoulder 46 (Figs. 6 and 8) a circular grid or grill 78 consisting of a ring 80 of heavy gauge stiff wire to which is attached a lattice of radial and circular wires 85. The grid may be flat or upwardly convex as may be desired and serves to support viands placed thereon for broiling or receptacles containing viands in a position directly above the heating elements. The grid may or may not be fastened to the rim of the bowl.

In order to provide a closed cooking chamber to confine the heat, cooking odors, and flying grease particularly when broiling, there is placed over the heating element a receptacle 82 in the form of a conventional cooking kettle or pan having an open mouth 84 which is of such diameter as to rest on the shoulder 48. As thus positioned, the bead 45 formed by the channel 44 is situated inside of the mouth of the kettle so that the latter is retained in place against lateral movement. By providing perfectly flat surfaces on the shoulder 48 and the mouth 84, a close fit may be obtained between them which will prevent escape of cooking odors and/or heat. Conventional handles 86 on the kettle provide means for lifting it from the rim of the bowl when the food has been completely cooked.

An important advantage of this construction is that when viands such as meats or fish are placed on the grill for broiling and subjected to the radiant heat given out by the heating coils, they are cooked without having direct contact with the heating elements thereby eliminating local charring. Another advantage is that the reflecting surfaces are so formed and situated that the heat from the coils will be distributed and reflected from the inside surface of the bowl in a manner to cross each other above the heating element at a low angle and from the inside surface of the cover to produce uniformity of cooking so that one portion will not be overdone while another portion is too rare or not done at all. By reflecting and re-reflecting the heat rays to concentrate them on all sides of the food being cooked, the time for cooking is greatly reduced, the amount of wattage necessary for cooking is minimized, and hence a more economical current consumption is attained with attendant savings in cost and operation. The drain holes 54 in the bottom of the bowl have two important functions: first, they permit the escape of steam and/or gases from the cooking operation and an entry of air to the bowl and hence to the interior of the cooking chamber; and second, they permit draining away grease and other liquids from the vicinity of the heating element so as to maintain the reflecting surfaces clean and by removing these greases and liquids eliminate any chance for smoking and hence for the formation of undesirable odors. In fact, the sloping surfaces of the bowl drain the liquid and greases so rapidly from the vicinity of the heating elements that they do not have an opportunity to become vaporized. Thus the apparatus is substantially self-cleaning with the result that the usual scrubbing, washing and scouring now necessary in cooking utensils of this kind is substantialy eliminated. Not only is this true with respect to the bowl, but the grill and the cover which are employed therewith will also be self-cleaned partly by the rapid drain of the grease and liquid deposited thereon and partly by consumption of the material by the radiant rays from the heating elements.

It is to be observed that this apparatus is particularly suitable for broiling steaks, chops and for roasting and frying since it will confine spattering or flying grease and cooking odors. Furthermore since most of the heat is reflected internally, a minimum amount of heat is dissipated into the surrounding atmosphere during the cooking operation, thereby avoiding heating of the atmosphere of the room or kitchen in which the cooking operation is being performed and, in fact, the amount of heat issuing therefrom is so small that the apparatus may be placed on a polished or varnished table top without damage thereto.

Figures 7, 8, 9:
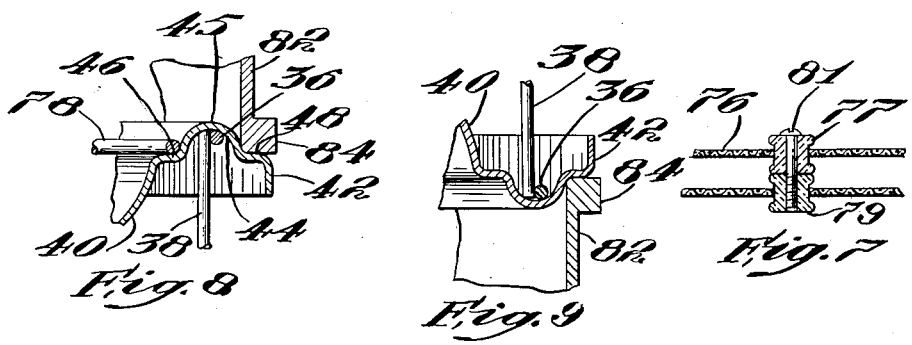
Fig. 7 is a fragmentary detail of the construction employed to support the protective screen above the reflector screen.
Fig. 8 is an enlarged section on the line 8—8 of Fig. 1.
Fig. 9 is an enlarged section on the line 9—9 of Fig. 5.

While, as shown in Fig. 1, the bowl 40 is situated in an upright position, that is, so that the heating elements direct the heat upwardly, the entire unit 14 may be inverted and placed with the rim 48 of the bowl resting on the rim 84 of the cooking kettle 82 resting in its normal position on its bottom (Figs. 5 and 9). In this position the bowl directs the heat rays from the heating elements downwardly into the kettle. As thus used, a wire basket 88 having handle portions 89 is placed in the kettle 82 and within the basket there is situated a fairly deep open-mouth receptacle 90, the rim 98 of which supports a shallow drain pan 92 having a bottom which slopes toward its center and which has a drain hole 94 at its center. The pan 92 has an annular rim 96 which rests on the rim 98 of the receptacle 90. The rim 96 has a broad flat annular shoulder 100 upon which there is placed a shallow wire basket 102 which is adapted to support food for exposure to the rays of the heating element. When viands to be broiled are placed in the basket, the liquids such as fats and greases which are cooked therefrom will drain by gravity through the hole 94 in the bottom of the shallow pan into the deep receptacle 90 where they will be confined unexposed to the radiant heat of the heater and hence in a partially cooled state so that they will not smoke and/or give off penetrating and disagreeable odors. The basket 102 may be replaced by an imperforate receptacle if the viands are of a kind that must be cooked in water or cannot conveniently be supported by the open lattice of the basket. The basket 88 provides convenient means for removing or placing the receptacles 90, 92 and basket 102 in the kettle 82.

As thus far described, the apparatus is set forth primarily as a highly improved form of cooking apparatus, but it is to be understood that it has a secondary function as a room heater. In this aspect the heat generating unit 14 is lifted from the supporting frame 12, the cooking kettle 16 is discarded and is then placed upright on the base of the cage to which it is attached or set on its side to focus the bowl on any particular portion of a space or room to be heated. In this aspect he heating unit will serve equally as well as any conventional bowl type or sunray heater, and since by its construction it is self-cleaning, it may be employed after having been used for cooking without scrubbing or otherwise cleaning it to make its surfaces efficient as heat reflectors.

In use, if the apparatus is to be employed with the supporting frame, the shallow pan 32 is first placed on the top shelf of the frame, then the heat generating unit 14 is placed with its supporting cage within the pan. If viands such as meats and fish are to be broiled, the convex grill 76 is employed and the viands are placed on its surface. Thereafter a kettle or pan is inverted and placed over the grill whereupon the switch is actuated to energize the heating coils. During the cooking the greases and fats which cook out of the viands drain through the apertures in the bottom of the bowl onto the pan 32. It is to be observed that the apertures in the bottom of the bowl are placed so that no liquid will fall onto the tube 70. If the viands are to be cooked in containers, a flat grid is employed in place of the convex grid. If the frame is discarded and the apparatus is placed on a table, the pan 32 must also be employed to receive the liquid from the bowl.

When the apparatus is used in the inverted position, the kettle is first placed on its bottom, then receptacles 90 and 92 are placed in the basket 88. If the viands are to be broiled, the basket 102 is then placed in the receptacle 92 and the assembled parts are lowered into the kettle. Finally the heat generating unit 14 is inverted and placed on the rim of the kettle. If the viands are to be cooked in liquid, the basket 102 may be replaced by an imperforate pan.

It should be understood that the present disclosure is for the purpose of illustration only and that this invention includes all modifications and equivalents which fall within the scope of the appended claims.

I claim:

1. A portable stove comprising a shallow bowl having a flanged rim including a bead and shoulders at opposite sides thereof and having apertures in its bottom, a radiant heater element situated in the bowl above the bottom and substantially at the focal point thereof, a reflective screen below the heater element, a protective screen above the heater element, a grid resting on the shoulder inside of the bead above the radiant heater and protective screen having a reticulated surface upon which may be placed viands to be cooked, an open-mouth receptacle resting in an inverted position above the grid with its mouth resting on the shoulder outside of the bead, said receptacle defining an enclosed cooking space above the grid which confines the cooking vapors and odors, and a tray siutated below and outside of the bowl for receiving cooking juices draining from the vicinity of the heater at the bottom of the bowl through said apertures.

2. A portable stove comprising a shallow bowl the bottom of which is elevated to form an island substantially centrally thereof, circumscribed by a trough, a radiant heater situated in the bowl on the island substantially at the focal point thereof, said bowl having a plurality of apertures therein substantially equally spaced around the island in the bottom of the trough, a reflective shield below the heater but above the apertures shielding the same from the direct rays of the heater, a protective screen above the heater to protect it from vapors and liquids, a grid resting on the rim of the bowl above the heater having a convex reticulated surface upon which may be placed viands to be cooked, a receptacle having an open mouth of substantially the same diameter as the diameter of the bowl resting in an inverted position on the rim above the bowl with the convex surface of the grid projecting into its mouth, said receptacle defining with the bowl a closed cooking space for retaining the cooking vapors and odors and confining the cooking heat, and a pan situated below and outside of the bowl for receiving the cooking juices draining from the vicinity of the radiant heater through said apertures in the bottom of the trough.

3. Portable heating apparatus comprising a shallow bowl having a bordering rim and apertures in the bottom thereof, an open lattice frame supporting the rim of the bowl in an upright position, a radiant heater element situated within the bowl below its rim but above its bottom, substantially at its focal point, a convex reticulated circular grid situated above the heater with its peripheral edge resting on the rim of the bowl, a receptacle having an open mouth of substantially the same diameter as the bowl resting in an inverted position with its mouth on the rim of the bowl and having a bottom by which the apparatus may be supported in an inverted position, means below the bowl within the frame for supplying current to the radiant heater element, said means being selectively operable to vary the supply of current to the radiant heater element, a pan below and outside of the bowl in a position to receive fluid draining through the apertures in the bottom of the bowl, and within which rests the bottom of the frame.

BUTLER AMES.

REFERENCES CITED

The following references are of record in the file of this patent:

UNITED STATES PATENTS

| Number | Name | Date |
|---|---|---|
| 2,090,122 | Hicks | Aug. 17, 1937 |
| 2,135,318 | Barkinsky et al. | Nov. 1, 1938 |
| 2,342,692 | Rehm | Feb. 29, 1944 |
| 2,397,478 | Drechsler et al. | Apr. 2, 1946 |
| 2,448,956 | Christensen | Sept. 7, 1948 |
| 2,486,862 | Meyer | Nov. 1, 1949 |
| 2,496,654 | Alsdorf | Feb. 7, 1950 |

FOREIGN PATENTS

| Number | Country | Date |
|---|---|---|
| 227,323 | Switzerland | June 15, 1943 |